US008915232B2

(12) United States Patent
Tamai et al.

(10) Patent No.: US 8,915,232 B2
(45) Date of Patent: Dec. 23, 2014

(54) FUEL SUPPLY PUMP

(71) Applicant: Denso Corporation, Kariya, Aichi-pref. (JP)

(72) Inventors: Naoya Tamai, Kariya (JP); Tadaaki Makino, Nukata-gun (JP)

(73) Assignee: Denso Corporation, Kariya (JP)

( * ) Notice: Subject to any disclaimer, the term of this patent is extended or adjusted under 35 U.S.C. 154(b) by 200 days.

(21) Appl. No.: 13/721,447

(22) Filed: Dec. 20, 2012

(65) Prior Publication Data

US 2013/0206112 A1 Aug. 15, 2013

(30) Foreign Application Priority Data

Feb. 10, 2012 (JP) .................................. 2012-27098

(51) Int. Cl.

*F02M 37/04* (2006.01)
*F16H 53/06* (2006.01)
*F02M 69/02* (2006.01)
*F02M 59/10* (2006.01)
*F04B 1/04* (2006.01)

(52) U.S. Cl.

CPC ............ *F02M 69/02* (2013.01); *F02M 59/102* (2013.01); *F04B 1/0413* (2013.01); *F04B 1/0426* (2013.01)
USPC ............................................ 123/508; 74/569

(58) Field of Classification Search

CPC ............................ F04B 1/0417; F04B 1/0413
USPC .............. 123/508; 74/569; 417/269, 271, 470
See application file for complete search history.

(56) References Cited

U.S. PATENT DOCUMENTS

| | | | | |
|---|---|---|---|---|
| 5,415,533 | A * | 5/1995 | Egger et al. | 417/471 |
| 6,009,858 | A * | 1/2000 | Teerman | 123/506 |
| 7,024,980 | B2 * | 4/2006 | Uryu et al. | 92/72 |
| 7,156,079 | B2 * | 1/2007 | Kamiyama et al. | 123/508 |
| 7,311,087 | B2 * | 12/2007 | Shaull et al. | 123/509 |
| 2006/0104843 | A1 * | 5/2006 | Inoue | 417/490 |
| 2007/0071622 | A1 | 3/2007 | Schoeppe | |
| 2007/0154326 | A1 | 7/2007 | Merz et al. | |
| 2013/0042930 | A1 * | 2/2013 | Kauss et al. | 137/494 |

FOREIGN PATENT DOCUMENTS

| | | | |
|---|---|---|---|
| DE | 3737042 | C2 * | 4/1990 |
| EP | 1 413 749 | | 4/2004 |
| JP | 04-132453 | | 12/1992 |
| JP | 2007-500303 | | 1/2007 |
| JP | 2007-092754 | | 4/2007 |
| WO | WO 2011091837 | A1 * | 8/2011 |

* cited by examiner

*Primary Examiner* — Stephen K Cronin
*Assistant Examiner* — Josh Campbell
(74) *Attorney, Agent, or Firm* — Nixon & Vanderhye PC

(57) ABSTRACT

A tappet support member includes at least two slide surfaces and at least two press-fitting projections. The at least two slide surfaces, are planar and extend in an axial direction of a plunger. The at least two slide surfaces are substantially parallel to each other and are opposed to each other, and a shoe of a tappet is axially reciprocatably supported by the at least two slide surfaces. Each of the at least two press-fitting projections projects from a corresponding side of the tappet support member that is opposite from a corresponding one of the at least two slide surfaces, and each of the at least two press-fitting projections is press-fitted into a pump housing, which is stationary relative to the tappet.

8 Claims, 4 Drawing Sheets

FUEL SUPPLY PUMP

CROSS REFERENCE TO RELATED APPLICATION

This application is based on and incorporates herein by reference Japanese Patent Application No. 2012-27098 filed on Feb. 10, 2012.

TECHNICAL FIELD

The present disclosure relates to a fuel supply pump.

BACKGROUND

A fuel supply pump, which pressurizes fuel to a high pressure of some hundreds of megapascals (MPa), has been known. Such a fuel supply pump is used to supply the fuel to an internal combustion engine through an accumulator (e.g., a common rail).

One such a fuel supply pump includes a high pressure pump and a tappet. In the high pressure pump, a plunger is axially reciprocated to draw fuel into a pressurizing chamber and to discharge the drawn pressurized fuel from the pressurizing chamber. The tappet converts rotation of a cam into linear reciprocation to axially reciprocate the plunger. Furthermore, the tappet includes a roller, a shoe and a tappet body. The roller reciprocates in the axial direction of the plunger while rotating about a rotational axis of the roller in response to the rotation of the cam. The shoe rotatably supports an outer peripheral surface of the roller. The tappet body holds the roller and the shoe and reciprocates in the axial direction of the plunger. Furthermore, the pump housing slidably supports the tappet body such that the pump housing holds the tappet in a manner that enables axial reciprocation of the plunger.

In order to reduce the weight of the tappet and limit rotation of the shoe, a fuel supply pump, which is disclosed in, for example, EP1413749A2, may be provided.

Specifically, in the fuel supply pump of EP1413749A2, the tappet includes a roller and a shoe. The shoe is configured into a quadrangular prism form. Furthermore, a tappet support member is press-fitted into the pump housing. The tappet support member supports the tappet to enable reciprocation of the tappet in the axial direction of the plunger. A quadrangular prism shaped slide hole, which slidably supports the shoe, extends through the tappet support member in the axial direction of the plunger. The pump housing slidably supports the shoe through the tappet support member such that the pump housing holds the tappet in a manner that enables axial reciprocation of the plunger.

Thereby, in the fuel supply pump of EP1413749A2, the tappet body is eliminated from the tappet to reduce the weight of the tappet, and rotation of the shoe is limited by configuring each of the shoe and the slide hole into the quadrangular prism form.

However, in the fuel supply pump of EP1413749A2, the press-fitting of the tappet support member into the pump housing may cause distortion of the slide surfaces of the slide hole of the tappet support member. Therefore, the reprocessing of the slide hole after the press-fitting of the tappet support member may be required.

SUMMARY

The present disclosure is made in view of the above disadvantages.

According to the present disclosure, there is provided a fuel supply pump, which includes a high pressure pump, a tappet and a tappet support member. The high pressure pump draws fuel into a pressurizing chamber of the high pressure pump and discharges the drawn fuel from the pressurizing chamber when a plunger of the high pressure pump is reciprocated in an axial direction of the plunger. The tappet converts rotation of a cam into linear reciprocation of the plunger in the axial direction of the plunger when the cam is rotated. The tappet includes a roller and a shoe. The roller is configured into a cylindrical form. The roller is rotated about a rotational axis of the roller and is reciprocated in the axial direction of the plunger when the cam is rotated. The shoe rotatably holds an outer peripheral surface of the roller. The shoe is reciprocated in the axial direction of the plunger when the cam is rotated. The tappet support member includes at least two slide surfaces and at least two press-fitting projections. The at least two slide surfaces are planar and extend in the axial direction of the plunger. The at least two slide surfaces are substantially parallel to each other and are opposed to each other. The shoe is axially reciprocatably supported by the at least two slide surfaces. Each of the at least two press-fitting projections projects from a corresponding side of the tappet support member that is opposite from a corresponding one of the at least two slide surfaces. Each of the at least two press-fitting projections is press-fitted into a pump housing, which is stationary relative to the tappet.

BRIEF DESCRIPTION OF THE DRAWINGS

The drawings described herein are for illustration purposes only and are not intended to limit the scope of the present disclosure in any way.

DETAILED DESCRIPTION

Figure 1:
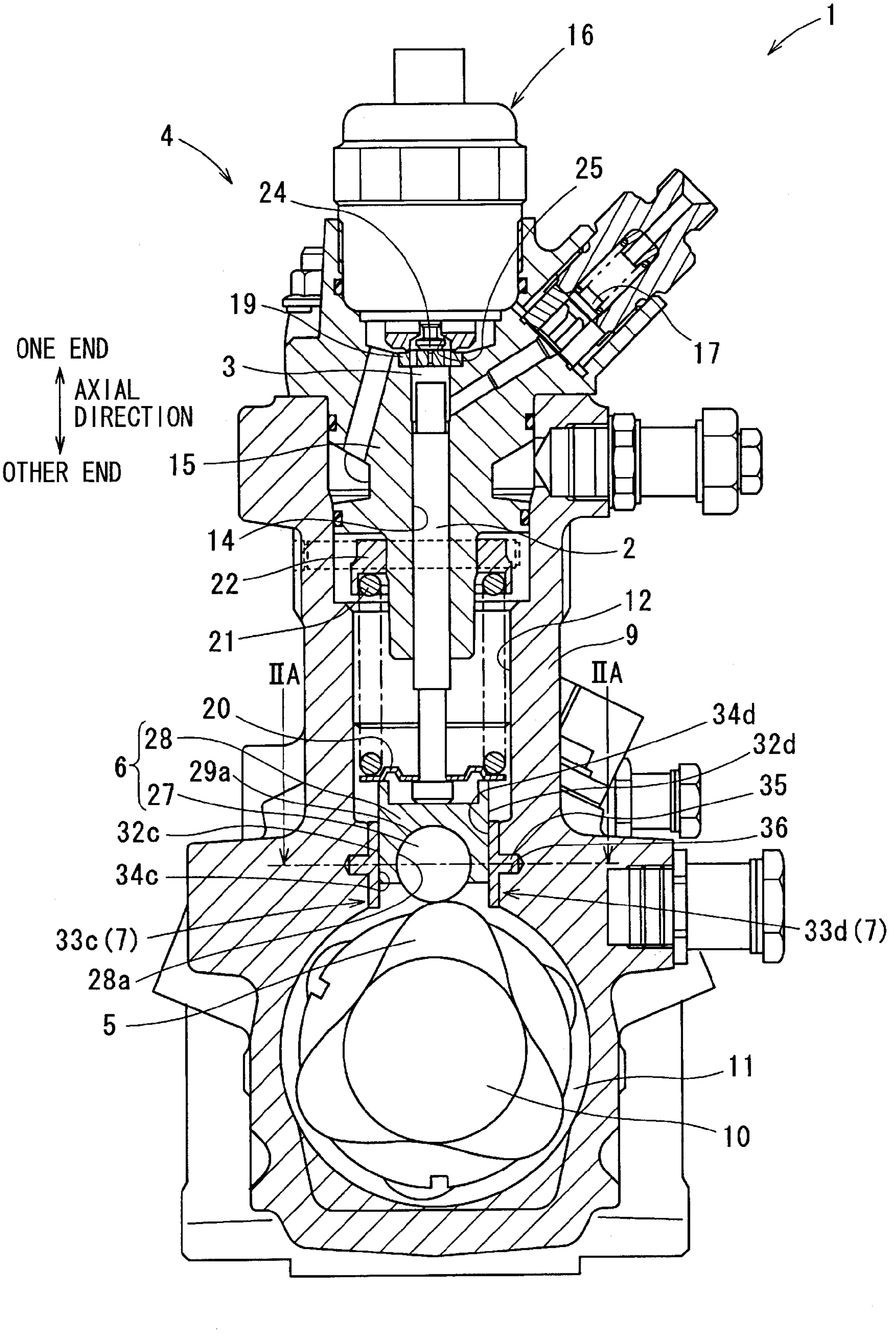
FIG. 1 is a schematic view showing an entire structure of a fuel supply pump according to an embodiment of the present disclosure.

An embodiment of the present disclosure will be described with reference to the accompanying drawings.

Now, a structure of a fuel supply pump 1 of the present embodiment will be described with reference to FIGS. 1 to 2B.

The fuel supply pump 1 is installed in a vehicle (e.g., an automobile) and pressurizes fuel to the high pressure of several hundreds of megapascals (MPa) to supply the pressurized fuel to an internal combustion engine of the vehicle through an accumulator (e.g., a common rail) and is controlled by a predetermined electronic control unit (ECU) installed in the vehicle.

The fuel supply pump 1 includes a high pressure pump 4, a tappet 6 and a tappet support member 7. At the high pressure pump 4, in response to axial reciprocation of a plunger 2, the fuel is drawn into a pressurizing chamber 3 and is then discharged from the pressurizing chamber 3 upon pressurization of the fuel at the high pressure. The tappet 6 converts rotation of a cam 5 into linear reciprocation to reciprocate the plunger 2 in an axial direction (a top-to-bottom direction in FIG. 1) of the plunger 2. In FIG. 1, an upper side, at which the upper end of the plunger 2 is located, may be also referred to as one end side (or one side), and a lower side, at which the lower end of the plunger 2 is located, may be also referred to as the other end side (or the other side). The tappet support member 7 supports the tappet 6 in a manner that enables axial reciprocation of the tappet 6 in the axial direction of the plunger 2. That is, the tappet 6 is axially reciprocatably supported by the tappet support member 7. In the following discussion, the axial direction of the plunger 2 may also be simply referred to as an axial direction unless otherwise stated.

The pump housing 9 of the fuel supply pump 1 includes a cam chamber 11 and a support hole 12. The cam chamber 11 receives the cam 5 and a pump shaft 10 in a manner that enables rotation of the cam 5 and the pump shaft 10. The support hole 12 opens to the cam chamber 11. The support hole 12 is provided to support the tappet 6 in a manner that enables the axial slide movement of the tappet 6. In FIG. 1, a lower end of the support hole 12 opens to the cam chamber 11. Furthermore, an upper end of the support hole 12 is closed upon installation of the high pressure pump 4 to the pump housing 9. The pump housing 9 is made of an aluminum material (e.g., aluminum or an aluminum alloy).

The pump shaft 10 is rotated by a rotational force of the internal combustion engine. Three lobes of the cam 5 radially outwardly protrudes from an outer peripheral surface of the pump shaft 10 and are arranged one after another at 120 degree intervals in the circumferential direction along the outer peripheral surface of the pump shaft 10. In the present embodiment, multiple pumping arrangements, each of which includes the high pressure pump 4, the cam 5 and the tappet 6, are arranged one after another along the pump shaft 10 in the axial direction of the pump shaft 10 to have different operational phases, respectively. Furthermore, a low pressure feed pump (not shown) is provided at one axial end of the pump shaft 10. The low pressure feed pump draws the fuel, which has a pressure that corresponds to the atmospheric pressure, from a fuel tank (not shown), and then the low pressure feed pump discharges the drawn fuel to the pressurizing chamber 3. Furthermore, lubricating oil is supplied to the cam chamber 11 and the support hole 12.

The high pressure pump 4 includes the plunger 2, a cylinder head 15 and a metering valve 16. The plunger 2 is driven by the cam 5 through the tappet 6. The cylinder head 15 includes a slide hole 14, which axially slidably receives the plunger 2. The metering valve 16 is a solenoid valve, which meters, i.e., adjusts a quantity of fuel discharged from the pressurizing chamber 3. At the high pressure pump 4, the fuel is drawn into the pressurizing chamber 3 through the metering valve 16, and the drawn fuel is pressurized in the pressurizing chamber 3 in response to the operation of the metering valve 16. Thereafter, the pressurized fuel is discharged from the pressurizing chamber 3 to the common rail through a check valve 17.

The pressurizing chamber 3 slidably receives the plunger 2 in the slide hole 14. Furthermore, an upper end of the slide hole 14 is closed by the metering valve 16 through a stopper plate 19 to define the pressurizing chamber 3 in the slide hole 14. When the plunger 2 is driven downward toward the lower side in FIG. 1, a volume of the pressurizing chamber 3 is increased. In contrast, when the plunger 2 is driven upward toward the upper side in FIG. 1, the volume of the pressurizing chamber 3 is reduced. A common rail side flow passage (a downstream side flow passage) is formed to open to the pressurizing chamber 3, and the check valve 17 is received in this downstream side flow passage.

Furthermore, the lower end of the plunger 2 axially projects from the low end of the slide hole 14 and is urged downward toward the lower side in FIG. 1 by a spring 21 through a lower seat 20, so that the lower end of the plunger 2 always contacts the tappet 6. Here, a lower end of the spring 21 is supported by the tappet 6 through the lower seat 20, and an upper end of the spring 21 is supported by the cylinder head 15 through an upper seat 22. Thereby, the spring 21 urges the plunger 2 and the tappet 6 toward the lower side in FIG. 1.

Opening and closing of the metering valve 16 is controlled by the ECU. For example, when the volume of the pressurizing chamber 3 is reduced upon the upward movement of the plunger 2 toward the upper side in FIG. 1, the metering valve 16 closes the pressurizing chamber 3 relative to the low pressure feed pump side (the upstream side), so that the fuel is discharged from the pressurizing chamber 3 toward the common rail side (the downstream side).

Furthermore, at the valve closing time, a valve element 24 of the metering valve 16 is axially upwardly moved toward the upper side in FIG. 1 and is thereby seated against a valve seat 25, so that the pressurizing chamber 3 is closed relative to the upstream side flow passage. In contrast, at the valve opening time, the valve element 24 is axially downwardly moved toward the lower side in FIG. 1 and is thereby lifted away from the valve seat 25, so that the pressurizing chamber 3 is opened to the upstream side flow passage. At the time of opening the pressurizing chamber 3, the valve element 24 contacts the stopper plate 19, so that the axially downward movement of the valve element 24 toward the lower side in FIG. 1 is limited. The metering valve 16 is threadably fixed to the cylinder head 15.

The tappet 6 includes a roller 27 and a shoe 28. The roller 27 is configured into a cylindrical form (a solid cylindrical form). The roller 27 is rotated about a rotational axis of the roller 27 and is reciprocated in the axial direction of the plunger 2 when the cam 5 is rotated. The shoe 28 rotatably supports a cylindrical outer peripheral surface 29*a* of the roller 27 and is axially reciprocated in the axial direction of the plunger 2 when the cam 5 is rotated.

The roller 27 is integrally formed and includes a cylindrical portion 29 and two bulged portions 30. The cylindrical portion 29 includes the outer peripheral surface 29*a*, which slidably and rotatably contacts the cam 5 on the lower side of the cylindrical portion 29 and also slidably and rotatably contacts an arcuate surface (a semicylindrical surface serving as a roller support surface) 28*a* of the shoe 28 on the upper side of the cylindrical portion 29. The bulged portions 30 are outwardly bulged in the direction of the rotational axis of the roller 27 from two opposed ends, respectively, of the cylindrical portion 29. Outer surfaces 30*a*, 30*b* of the bulged portions 30 slidably and rotatably contact the tappet support member 7 and are also axially slidably contact the tappet support member 7 to allow the reciprocation of the roller 27 in the axial direction of the plunger 2.

Figure 2A:
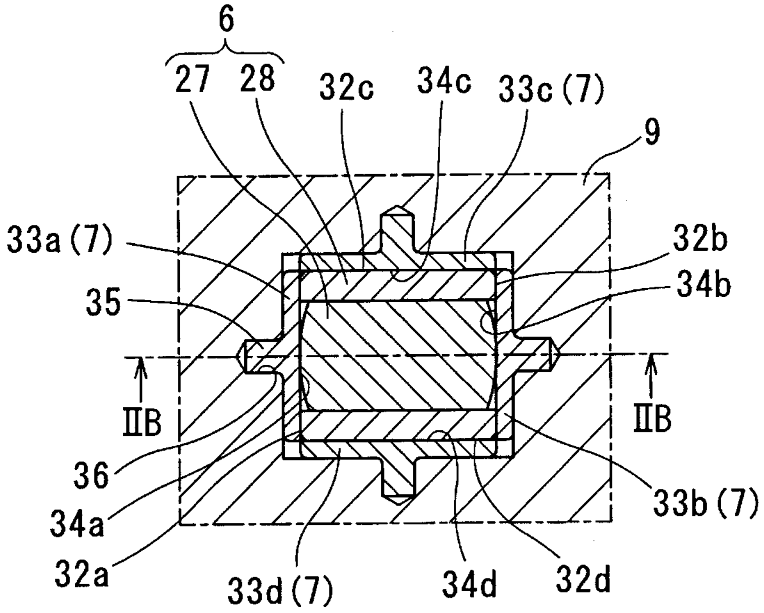
FIG. 2A is a partial cross-sectional view taken along line IIA-IIA in FIG. 1.
Figure 2B:
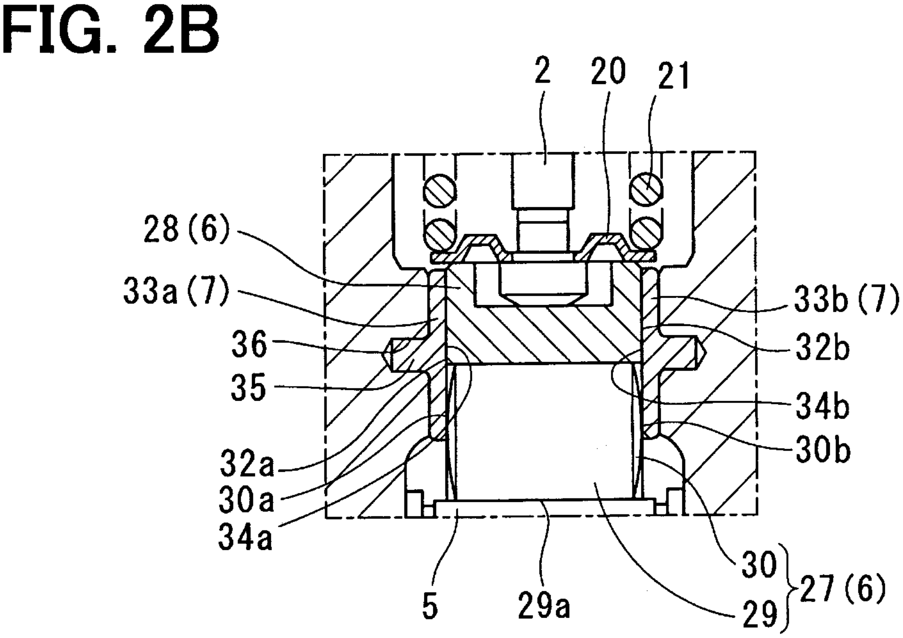
FIG. 2B is a partial cross-sectional view taken along line IIB-IIB in FIG. 2A.

In an axial view taken in the axial direction of the plunger 2, the shoe 28 is configured into a rectangular form. Specifically, as shown in FIGS. 2A and 2B, the shoe 28 includes two side surfaces (a group of side surfaces) 32*a*, 32*b*, each of which extends in the axial direction of the plunger 2. The side surfaces 32*a*, 32*b* are substantially parallel to each other, and the side surfaces 32*a*, 32*b* are opposed to each other in the direction of the rotational axis of the roller 27. The shoe 28 further includes other two side surfaces (another group of side surfaces) 32*c*, 32*d*, each of which extends in the axial direction of the plunger 2. The side surfaces 32*c*, 32*d* are substantially parallel to each other, and the side surfaces 32*c*, 32*d* are opposed to each other in a direction perpendicular to the rotational axis of the roller 27. The side surfaces 32*a*-32*d* of the shoe 28 slidably contact the tappet support member 7. Thus, when the shoe 28 is axially reciprocated, the side surfaces 32*a*-32*d* of the shoe 28 slide along the tappet support member 7. With reference to FIG. 1, the upper side of the shoe 28 contacts the lower end of the plunger 2 and supports the lower end of the spring 21 through the lower seat 20.

The tappet support member 7 includes four metal plates (metal sub-members) 33*a*-33*d*, which are made of a ferrous material (e.g., iron or an iron alloy). The metal plate 33*a* has a slide surface 34*a*, which slidably contacts the side surface 32*a* of the shoe 28. The metal plate 33*a* also has a press-fitting projection 35 that is provided on the other side of the metal plate 33*a*, which is opposite from the slide surface 34*a* in a corresponding direction that is perpendicular to the axial direction of the plunger 2. Similarly, each of the rest of the three metal plates 33*b*-33*d* has the slide surface 34*b*-34*d*, which slidably contacts the corresponding side surface 32*b*-32*d* of the shoe 28. Furthermore, each of the rest of the three metal plates 33*b*-33*d* has the press-fitting projection 35, which is similar to the press-fitting projection 35 of the metal plate 33*a*. The press-fitting projection 35 of each of the metal plates 33*a*-33*d* is press-fitted into a corresponding predetermined press-fitting hole 36, which is formed in the pump housing 9, i.e., which is recessed in the inner peripheral wall surface of the support hole 12 in a corresponding direction that is substantially perpendicular to the axial direction of the plunger 2 and coincides with the projecting direction of the corresponding press-fitting projection 35. The metal plates 33*a*-33*d* are positioned to correspond with the side surfaces 32*a*-32*d*, respectively, of the shoe 28. Thereby, the metal plates 33*a*-33*d* can axially slidably support the tappet 6 to enable the reciprocation of the tappet 6 along the metal plates 33*a*-33*d*.

Furthermore, the slide surfaces 34*a*, 34*b* of the metal plates 33*a*, 33*b* support the roller 27 such that the roller 27 is rotatable about the rotational axis of the roller 27, and the roller 27 is axially slidable along the slide surfaces 34*a* 34*b* to enable the axial reciprocation of the roller 27. Thereby, the metal plates 33*a*, 33*b* axially slidably support the shoe 28 to enable the axial reciprocation of the shoe 28. Also, at the same time, the metal plates 33*a*, 33*b* rotatably support the roller 27, and the metal plates 33*a*, 33*b* axially slidably support the roller 27 to enable the axial reciprocation of the roller 27.

Now, advantages of the present embodiment will be described.

In the fuel supply pump 1 of the present embodiment, in the axial view, the shoe 28 is configured into the rectangular form. Specifically, as shown in FIGS. 2A and 2B, the shoe 28 includes the side surfaces 32*a*, 32*b*, which are substantially parallel to each other and are opposed to each other in the direction of the rotational axis of the roller 27. The shoe 28 further includes the two side surfaces 32*c*, 32*d*, which are substantially parallel to each other and are opposed to each other in the direction perpendicular to the rotational axis of the roller 27. Furthermore, the tappet support member 7 includes the four metal plates 33*a*-33*d*. Each metal plate 33*a*-33*d* has the slide surface 34*a*-34*d*, which slidably contacts the corresponding side surface 32*a*-32*d* of the shoe 28, and the press-fitting projection 35, which is provided on the other side of the metal plate 33*a*-33*d* that is opposite from the slide surface 34*a*-34*d*. The press-fitting projection 35 of each metal plate 33*a*-33*d* is press-fitted into the corresponding predetermined press-fitting hole 36 of the pump housing 9 in the corresponding direction that is substantially perpendicular to the axial direction of the plunger 2.

Thereby, even when the metal plates 33*a*-33*d* are press-fitted to the pump housing 9 (more specifically, the inner peripheral wall surface of the support hole 12), the distortion of each metal plate 33*a*-33*d* is localized to an area of the press-fitting projection 35 of the metal plate 33*a*-33*d* and an area adjacent to the press-fitting projection 35 in the metal plate 33*a*-33*d*. Therefore, it is possible to limit the distortion of the slide surface 34*a*-34*d* of each metal plate 33*a*-33*d*. As a result, the need for reprocessing the slide surface 34*a*-34*d* of the metal plate 33*a*-33*d* upon the press-fitting of the metal plate 33*a*-33*d* can be eliminated or minimized.

Furthermore, the tappet support member 7 axially slidably supports the tappet 6 in the manner that enables the axial reciprocation of the tappet 6 through the use of the combination of the two slide surfaces (a group of slide surfaces) 34*a*, 34*b*, which are substantially parallel to each other and are opposed to each other in the direction of the rotational axis of the roller 27, and the combination of the other two slide surfaces (another group of slide surfaces) 34*c*, 34*d*, which are substantially parallel to each other and are opposed to each other in the direction perpendicular to the rotational axis of the roller 27.

Thereby, the wobbling of the roller 27 and the shoe 28 can be limited.

Also, the tappet support member 7 is made of the ferrous material, which has the strength higher than the strength of the aluminum material that is the material of the pump housing 9.

Therefore, the slide contact of the roller 27 and the slide contact of the shoe 28 against the tappet support member 7 can be effectively supported with the material of the tappet support member 7, which has the high strength. As a result, it is possible to increase the lifetime of the fuel supply pump 1.

Now, modifications of the above embodiment will be described.

The fuel supply pump 1 of the present disclosure is not limited to the above described one and may be modified in various ways within the scope of the present disclosure.

Figure 3A:
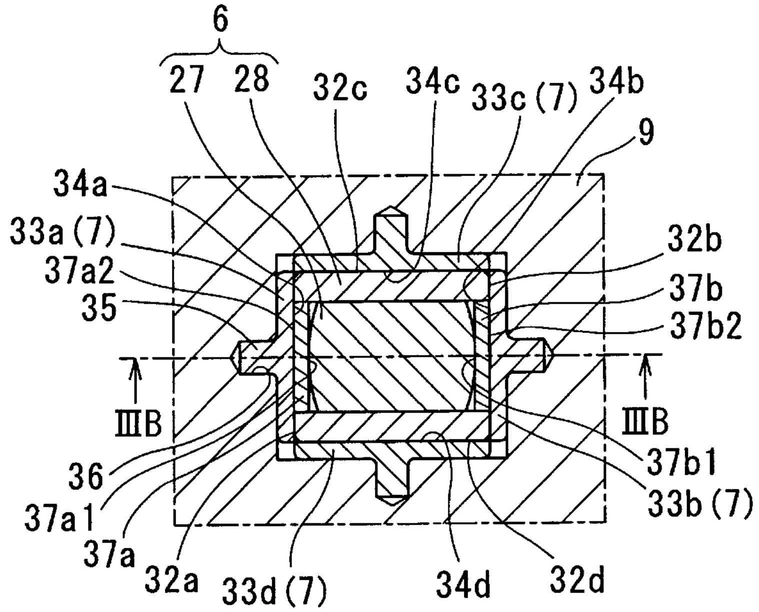
FIG. 3A is a partial cross-sectional view indicating a modification of the fuel supply pump of the embodiment, showing a cross section similar to FIG. 2A.
Figure 3B:
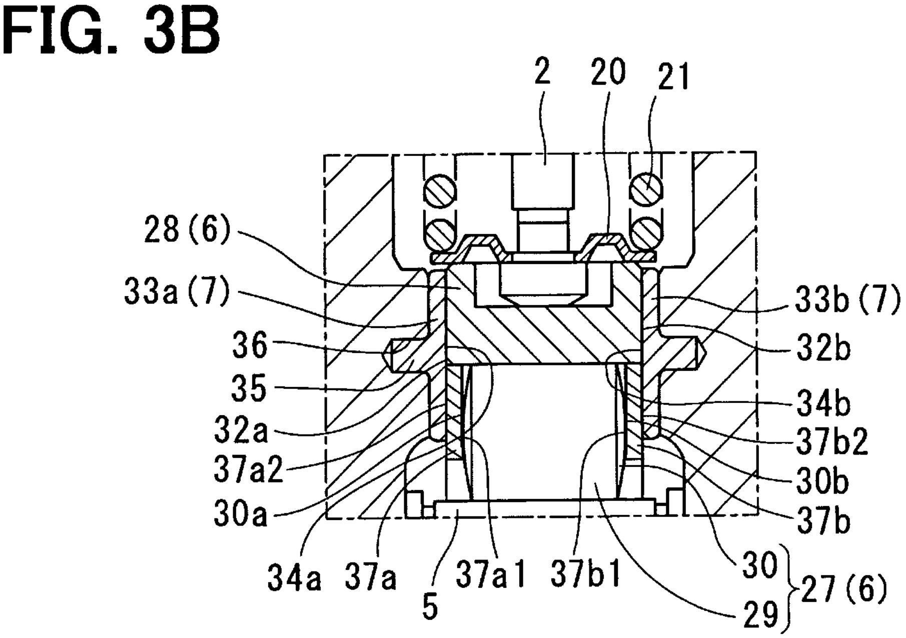
FIG. 3B is a partial cross-sectional view taken along line IIIB-IIIB in FIG. 3A.

For example, in the fuel supply pump 1 of the above embodiment, the roller 27 is rotatably and axially slidably supported by the slide surfaces 34*a*, 34*b* of the tappet support member 7. Alternatively, as shown in FIGS. 3A and 3B, it is possible to provide two metal plates 37*a*, 37*b*. Specifically, each metal plate 37*a*, 37*b* is configured into a semicircular plate form that has a semi-circular outer peripheral edge (arcuate outer peripheral edge) that corresponds to the arcuate surface 28*a* of the shoe 28 (see FIG. 1) that rotatably supports the cylindrical outer peripheral surface 29*a* of the roller 27. Each metal plate 37*a*, 37*b* is formed separately from the shoe 28 and is joined to the arcuate surface 28*a* of the shoe 28 along the semicircular outer peripheral edge of the metal plate 37*a*, 37*b* at an upper side of the metal plate 37*a*, 37*b* in FIG. 3B. Thereby, the metal plates 37*a*, 37*b* are reciprocated integrally with the shoe 28 in the axial direction of the plunger 2. Each of the metal plates 37*a*, 37*b* has a roller support surface 37*a*1, 37*b*1 and a tappet support member side slide surface 37*a*2, 37*b*2. The roller support surface 37*a*1, 37*b*1 and the tappet support member side slide surface 37*a*2, 37*b*2 of each metal plate 37*a*, 37*b* are planar and are provided at two opposite sides, respectively, of the metal plate 37*a*, 37*b*, which are opposite to each other in the direction of the rotational axis of the roller 27. The roller support surfaces 37*a*1, 37*b*1 of the metal plates 37*a*, 37*b* extend in the axial direction of the plunger 2. The roller support surfaces 37*a*1, 37*b*1 are substantially parallel to each other and are opposed to each other. In this modification, the length of the roller 27, which is measured along the rotational axis of the roller 27, is reduced in comparison to that of the above embodiment shown in FIGS. 2A and 2B. Thereby, each of the metal plates 37*a*, 37*b* can be held between the roller 27 and the corresponding metal plate 33*a*, 33*b* of the tappet support member 7 in the direction of the rotational axis of the roller 27, and thereby the roller support surfaces 37*a*1, 37*b*1 of the metal plates 37*a*, 37*b* can rotatably support the outer surfaces 30*a*, 30*b*, respectively, of the bulged portions 30 of the roller 27. Furthermore, the tappet support member side slide surfaces 37*a*2, 37*b*2 of the metal plates 37*a*, 37*b* axially slidably contact the slide surfaces 34*a*, 34*b*, respectively, of the metal plates 33*a*, 33*b* of the tappet support member 7 to enable the axial reciprocation of the roller 27 and the shoe 28 together with the metal plates 37*a*, 37*b*. Even with the above modification, the advantages similar to those of the above embodiment can be achieved.

Also, in a further modification, which is a modification of FIGS. 3A and 3B, the shoe 28 may be modified to enable reciprocation of the roller 27 relative to the shoe 28 in the axial direction of the plunger 2. More specifically, in the embodiment of FIGS. 1 to 2B, the arcuate surface 28*a* of the shoe 28 circumferentially extends more than 180 degrees about the rotational axis of the roller 27 to limit falling out of the roller 27 from the shoe 28. Alternatively, the arcuate surface 28*a* of the shoe 28 may circumferentially extend only 180 degrees or less to enable relative movement of the roller 27 relative to the shoe 28 in the axial direction of the plunger 2. In this way, the roller 27 may be rotatably and axially reciprocatably supported by the roller support surfaces 37*a*1, 37*b*1 of the metal plates 37*a*, 37*b*.

Figure 4A:
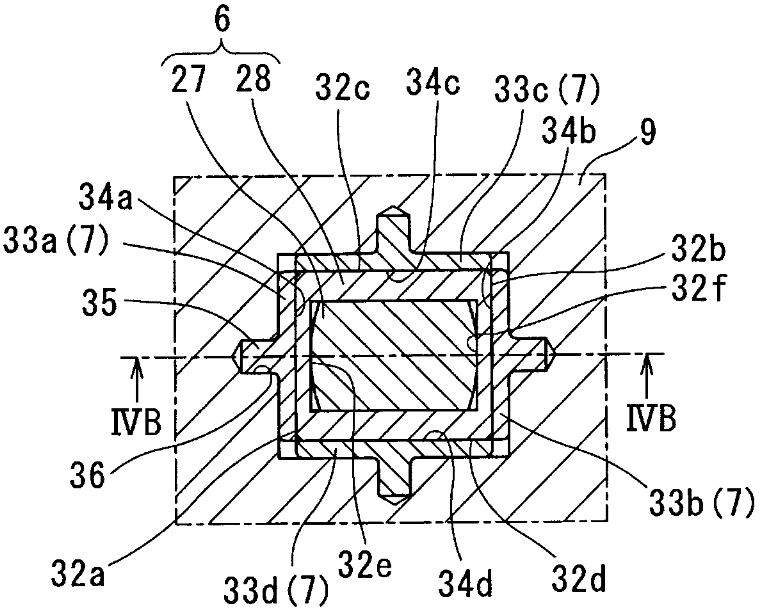
FIG. 4A is a partial cross-sectional view indicating another modification of the fuel supply pump of the embodiment, showing a cross section similar to FIG. 2A.
Figure 4B:
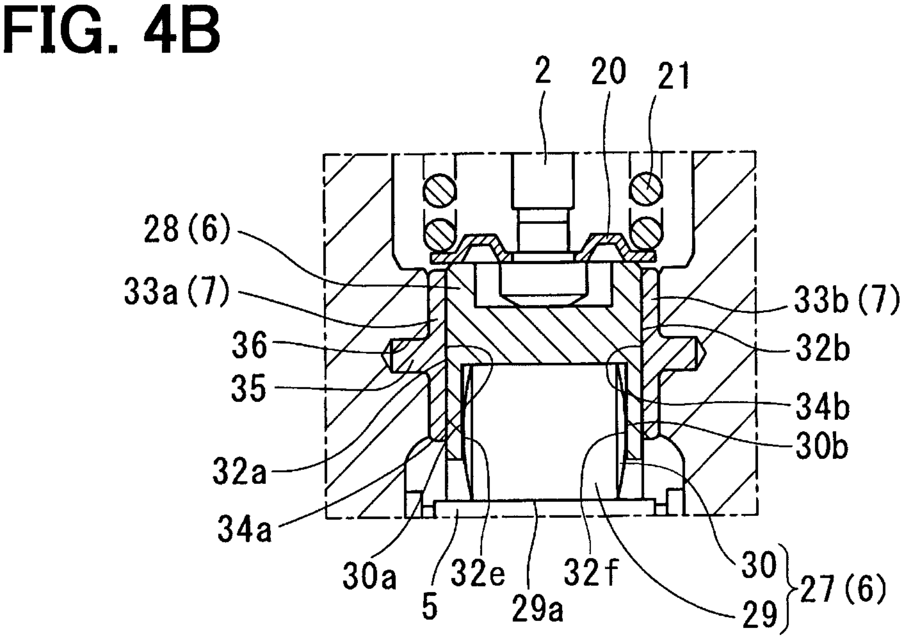
FIG. 4B is a partial cross-sectional view taken along line IVB-IVB in FIG. 4A.

Further alternatively, as shown in FIGS. 4A, 4B, the shoe 28 may be modified to have two roller support surfaces 32*e*, 32*f*, which are formed integrally with the shoe 28 and extend in the axial direction of the plunger 2. The roller support surfaces 32*e*, 32*f* are substantially parallel to each other and are opposed to each other. The roller support surfaces 32*e*, 32*f* of the shoe 28 rotatably support the outer surfaces 30*a*, 30*b*, respectively, of the bulged portions 30 of the roller 27. Even with the above modification, the advantages similar to those of the above embodiment can be achieved.

Furthermore, in the case of FIGS. 4A and 4B, in which the roller support surfaces 32*e*, 32*f* are provided in the shoe 28, the roller support surfaces 32*e*, 32*f* of the shoe 28 may be formed to withstand only the rotational slide contact of the roller 27 since the roller 27 and the shoe 28 are integrally reciprocated in the axial direction of the plunger 2.

Furthermore, in the fuel supply pump 1 of the above embodiment, the tappet 6 is axially slidably supported by the tappet support member 7 through the use of the combination of the two slide surfaces 34*a*, 34*b*, which are substantially parallel to each other and are opposed to each other in the direction of the rotational axis of the roller 27, and the combination of the other two slide surfaces 34*c*, 34*d*, which are substantially parallel to each other and are opposed to each other in the direction perpendicular to the rotational axis of the roller 27. Alternatively, the tappet 6 may be supported only by a corresponding one combination selected from the two combinations, i.e., the combination of the two slide surfaces 34*a*, 34*b* and the combination of the other two slide surfaces 34*c*, 34*d*. Further alternatively, the tappet 6 may be supported by another slide surface(s) in addition to the one combination selected from the combination of the two slide surfaces 34*a*, 34*b* and the combination of the other two slide surfaces 34*c*, 34*d*.

Furthermore, in the fuel supply pump 1 of the above embodiment, the tappet support member 7 includes the four metal plates 33*a*-33*d*. Each metal plate 33*a*-33*d* has the slide surface 34*a*-34*d* and the press-fitting projection 35, and the press-fitting projection 35 is provided on the other side of the metal plate 33*a*-33*d* that is opposite from the slide surface 34*a*-34*d* in the corresponding direction that is substantially perpendicular to the axial direction of the plunger 2. Alternatively, the tappet support member 7 may be made of a single metal member. In such a case, two or more slide surfaces (e.g., slide surfaces similar to the two slide surfaces 34*a*, 34*b* and/or the other two slide surfaces 34*c*, 34*d*) may be provided in the single metal member, and the press-fitting projection 35 may be provided in the opposite side of one or more of the slide surfaces. Further alternatively, the tappet support member 7 may be made of two metal members (two metal sub-members), which are formed separately. In such a case, one or more slide surfaces (similar to one or more of the slide surfaces 34*a*-34*d*) may be provided in each of the two metal members, and a press-fitting projection 35 may be provided in the opposite side of one or more of the slide surfaces in each of the two metal members.

Furthermore, each of the metal plates 33-33*d* of the above embodiment may have more than one press-fitting projection 35 (i.e., a plurality of press-fitting projections 35, each of which is press fitted into the corresponding press-fitting hole 36 in the direction substantially perpendicular to the axial direction of the plunger 2).

Additional advantages and modifications will readily occur to those skilled in the art. The present disclosure in its broader terms is therefore not limited to the specific details, representative apparatus, and illustrative examples shown and described.

What is claimed is:

1. A fuel supply pump comprising:

a high pressure pump that draws fuel into a pressurizing chamber of the high pressure pump and discharges the drawn fuel from the pressurizing chamber when a plunger of the high pressure pump is reciprocated in an axial direction of the plunger;

a tappet that converts rotation of a cam into linear reciprocation of the plunger to reciprocate the plunger in the axial direction, wherein the tappet includes:

a roller that is configured into a cylindrical form, wherein the roller is rotated and is reciprocated in the axial direction of the plunger in response to rotation of the cam; and a shoe that rotatably holds an outer peripheral surface of the roller and is reciprocatable in the axial direction of the plunger; and a tappet support member that includes:

at least two slide surfaces, which are substantially parallel to each other in the axial direction of the plunger and are opposed to each other, and the shoe is reciprocatably supported in the axial direction of the plunger by the at least two slide surfaces; and at least two press-fitting projections, each of which projects from a corresponding side of the tappet support member that is opposite from a corresponding one of the at least two slide surfaces, and each of the at least two press-fitting projections is press-fitted into a pump housing, which is stationary relative to the tappet.

2. The fuel supply pump according to claim 1, wherein the at least two slide surfaces include four slide surfaces, which are divided into two groups, and each of the two groups includes corresponding two of the four slide surfaces.

3. The fuel supply pump according to claim 1, wherein the tappet support member is made of a material, which has a higher strength in comparison to a material of the pump housing.

4. The fuel supply pump according to claim 3, wherein the material of the tappet support member is a ferrous material, and the material of the pump housing is an aluminum material.

5. The fuel supply pump according to claim 1, wherein the roller is rotatably and reciprocatably supported in the axial direction of the plunger by the at least two slide surfaces.

6. The fuel supply pump according to claim 1, wherein the shoe includes a roller support surface, which rotatably supports the roller.

7. The fuel supply pump according to claim 1, wherein:
the tappet support member includes at least two sub-members, which are formed separately from each other;
each of the at least two sub-members has one or more of the at least two slide surfaces and one or more of the at least two press-fitting projections.

8. The fuel supply pump according to claim 7, wherein the at least two sub-members include at least four sub-members, each of which is formed as a metal plate.

* * * * *